United States Patent [19]
Alarcón-López et al.

[11] Patent Number: 5,917,104
[45] Date of Patent: Jun. 29, 1999

[54] METHOD FOR DETECTING AND ADJUSTING THE POSITION OF A BURNER DURING THE ANNEALING PROCESS OF A GLASS SHEET

[75] Inventors: Manuel Alarcón-López, Bondojito; Lenin Román-Gómez, Ecatepec de Morelos; Rafael Jorge Rojas-Cortes, Tlanepantla; Victor Enciso-Aguilar, Ecatepec de Morelos; Severino Islas-Sánchez, Ojo de Agua Tecemac; José Carlos Montes-Juárez, Col. G. Ramos Millán, all of Mexico

[73] Assignee: Vidrio Plano de Mexico, S.A. de C.V., San Juan Ixhuatepec, Mexico

[21] Appl. No.: 08/923,353

[22] Filed: Sep. 4, 1997

Related U.S. Application Data

[62] Division of application No. 08/540,337, Oct. 6, 1995, Pat. No. 5,772,719.

[30] Foreign Application Priority Data

Jun. 9, 1995 [MX] Mexico ..................................... 952558

[51] Int. Cl.[6] .................................................. C03B 25/00
[52] U.S. Cl. .......................... 65/29.1; 65/29.12; 65/29.14; 65/95; 65/118; 65/158; 65/162; 65/271
[58] Field of Search ............................... 65/29.12, 29.15, 65/29.17, 29.14, 29.11, 29.1, 95, 99.6, 99.5, 99.2, 118, 119, 158, 160, 162, 182.4, 271, 273, DIG. 13

[56] References Cited

U.S. PATENT DOCUMENTS

| | | | |
|---|---|---|---|
| 2,539,131 | 1/1951 | Gundersen et al. | 65/158 |
| 2,671,987 | 3/1954 | Jendrisak | 65/158 |
| 3,159,170 | 12/1964 | Callan | 65/158 |
| 3,482,954 | 12/1969 | Yuen | 65/158 |
| 3,500,548 | 3/1970 | Mitsuno | 65/158 |
| 3,508,899 | 4/1970 | Ward | 65/162 |
| 3,805,072 | 4/1974 | Goersens et al. | 65/158 |
| 3,977,858 | 8/1976 | Taguchi | 65/158 |
| 4,008,062 | 2/1977 | Nishikori et al. | 65/99.2 |
| 4,726,832 | 2/1988 | Kajii et al. | 65/273 |
| 4,783,211 | 11/1988 | Fuchigami et al. | 65/273 |
| 4,909,822 | 3/1990 | Kitaya et al. | 65/162 |

FOREIGN PATENT DOCUMENTS 301914  4/1971  U.S.S.R. ............................... 65/29.12

*Primary Examiner*—Steven P. Griffin
*Attorney, Agent, or Firm*—Abelman, Frayne & Schwab

[57] ABSTRACT

A method for automatically detecting and adjusting the position of a plurality of burners with respect to the edge of a continuous glass sheet is provided. The glass sheet is transported by rolls along the length of a thermal treatment lehr. Detecting and adjusting sensors for sensing the edge of the glass sheet are attached conjointly with the burners in order to automatically adjust the position of the burners with regards to the edge of the glass sheet, so, for each variation in the width of the glass sheet, the detecting and adjusting sensors are advanced or retracted over the edge of the glass sheet, in order to adjust the burners in accordance with a new position of the edge of said glass sheet.

7 Claims, 6 Drawing Sheets

METHOD FOR DETECTING AND ADJUSTING THE POSITION OF A BURNER DURING THE ANNEALING PROCESS OF A GLASS SHEET

This is a divisional of application Ser. No. 08/540,337 filed Oct. 6, 1995, now U.S. Pat. No. 5,772,719.

BACKGROUND OF THE INVENTION

A) Field of the Invention

The present invention refers to a system and method for detecting and adjusting the position of a burner during the annealing process of a glass sheet, and, more particularly, to a system and a method to detect and automatically adjust the position of a plurality of burners placed on the borders of a continuous glass sheet during its annealing process.

B) Description of the Related Art

The production of glass sheets is initiated from a source of molten glass in a melting furnace. In such a furnace the smelted glass is conditioned to be drawn and then it flows successively through smelting, refining and conditioning chambers to then be supplied to a vertical drawing machine. When the glass begins to be drawn, it flows vertically through a drawing bar which maintains the width of the glass on a constant basis. Subsequently the glass sheet is vertically transported through a chamber made up by numerous pairs of rolls of the machine itself, just as the PPG process, or it continues on a horizontal form such as is used in the process of floated glass. Once the sheet is drawn, it goes on in a continuous form towards a thermal treatment lehr where the glass sheet gradually cools, also annealing the edges, and once it leaves the lehr, the edges are marked in order to remove the lateral irregular sections, and they are also marked transversally in keeping with the required size of the sheet.

Once the required glass sheets are obtained, the same are unloaded through the use of adequate means towards stackers—thus forming a block of various sheets, which must be stored in warehouses to be shipped at a later date.

One of the main problems of the manufacturing process of glass sheets is located in the annealing area. During the process treatment of the glass sheets, the sheets are horizontally moved on top of a series of rolls of a thermal treating lehr they are heated to a temperature of about 650° C. Later the sheets are gradually cool until all of the thermal stresses which were acquired during the manufacturing process is relieved.

During this annealing step it is very important that the lateral edges of the sheet be annealed with the application of independent heat. -which is achieved by the application of a series of burners. Since the edges are later cut, an incorrect annealing provokes their damage or that certain sections of the sheet crack once said sections are separated from the glass sheet.

However, due to the fact that in the manufacturing process of the glass sheets there are slight variations in the width of the same, the position of the burners must be adjusted transversally and in a continuous form, which is achieved starting through the detection of the edges of said sheet, and this is done in order to prevent an incorrect annealing of the same. To date, the adjustment of the burners over the edges of the glass sheet is carried out or is done in a manual manner, and said adjustment depends on the ability of operators and the frequency of the adjustments carried out.

With the end of eliminating the disadvantages of the related art, the present invention refers to a system and a method for automatic positioning the burners on the glass sheets which is done through a continuous detection of the width of the glass sheet.

By means of this system, a good annealing quality of the glass sheet edges is obtained, thus substantially reducing the production losses of the cutting line. In addition to the latter, it will no longer be necessary to depend on the ability of the operators in order to carry out the continuous adjustments of the position of the burners.

In keeping with the above, the present invention refers to a system and a method for detecting and automatically adjust the position of a plurality of burners in respect to the edges of a glass sheet; said glass sheet being annealed in a thermal treatment lehr, the system comprising: a support structure; a reciprocal structure coupled onto the support structure; at least one burner coupled to the reciprocal structure; sensing elements for sensing the position of the edge of the sheet, which are jointly attached to said burners, in order to adjust the position of said burners based on the position of the sensing elements over the edges of said glass sheet; and control means coupled to the sensing elements, in order to adjust the position of the burners in accordance with the real position of the sensing elements placed on the edge of said glass sheet.

OBJECTIVES OF THE INVENTION

It is a first objective of the present invention to provide a system and a method to detect and automatically adjust the position of a plurality of burners in relation to the edges of a glass sheet, which permits the applying of a good thermal treatment to the edges of said glass sheets, thus preventing losses at the glass cutting line due to a bad annealing of the glass sheets.

An additional objective of the present invention is to provide a system and a method in order to detect and automatically adjust the position of a plurality of burners in respect to the edges of a glass sheet, which automatically adjusts the position of the burners in accordance with the width of the glass sheet.

An additional objective of the present invention, is to provide a system and a method to detect and automatically adjust the position of a plurality of burners in respect to the edges of a glass sheet, which is easy to maintain and to operate.

These and other objectives and additional advantages of the present invention will become evident to the experts in the field from the following detailed description of the invention, and the same will be made in reference to a specific embodiment of the same in an illustrative sense but that does not limit this invention.

DETAILED DESCRIPTION OF THE INVENTION

Figure 1:
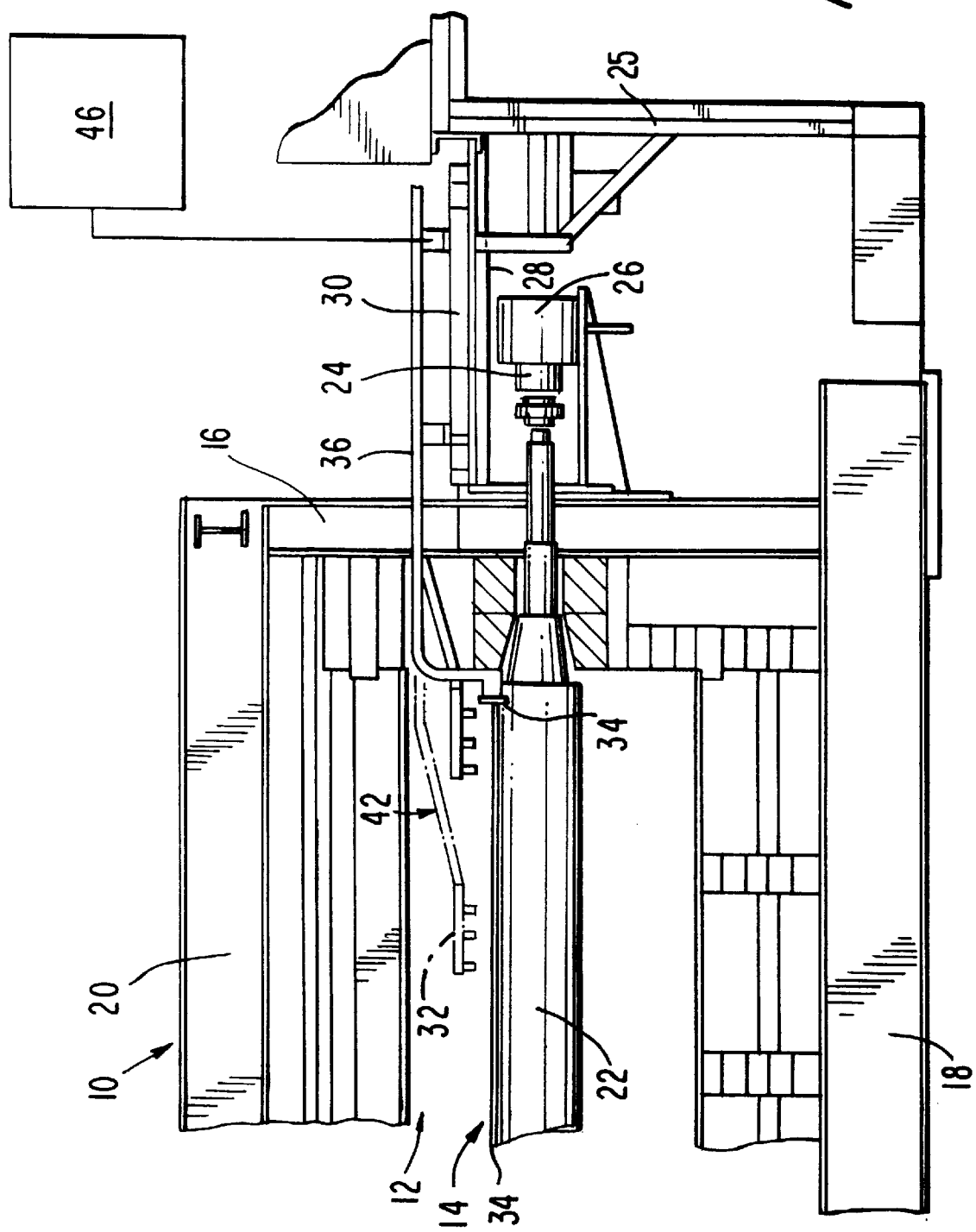
FIG. 1 shows an elevation view of a transversal section of the system of the present invention and its positioning in respect to a thermal treatment lehr.
Figure 2:
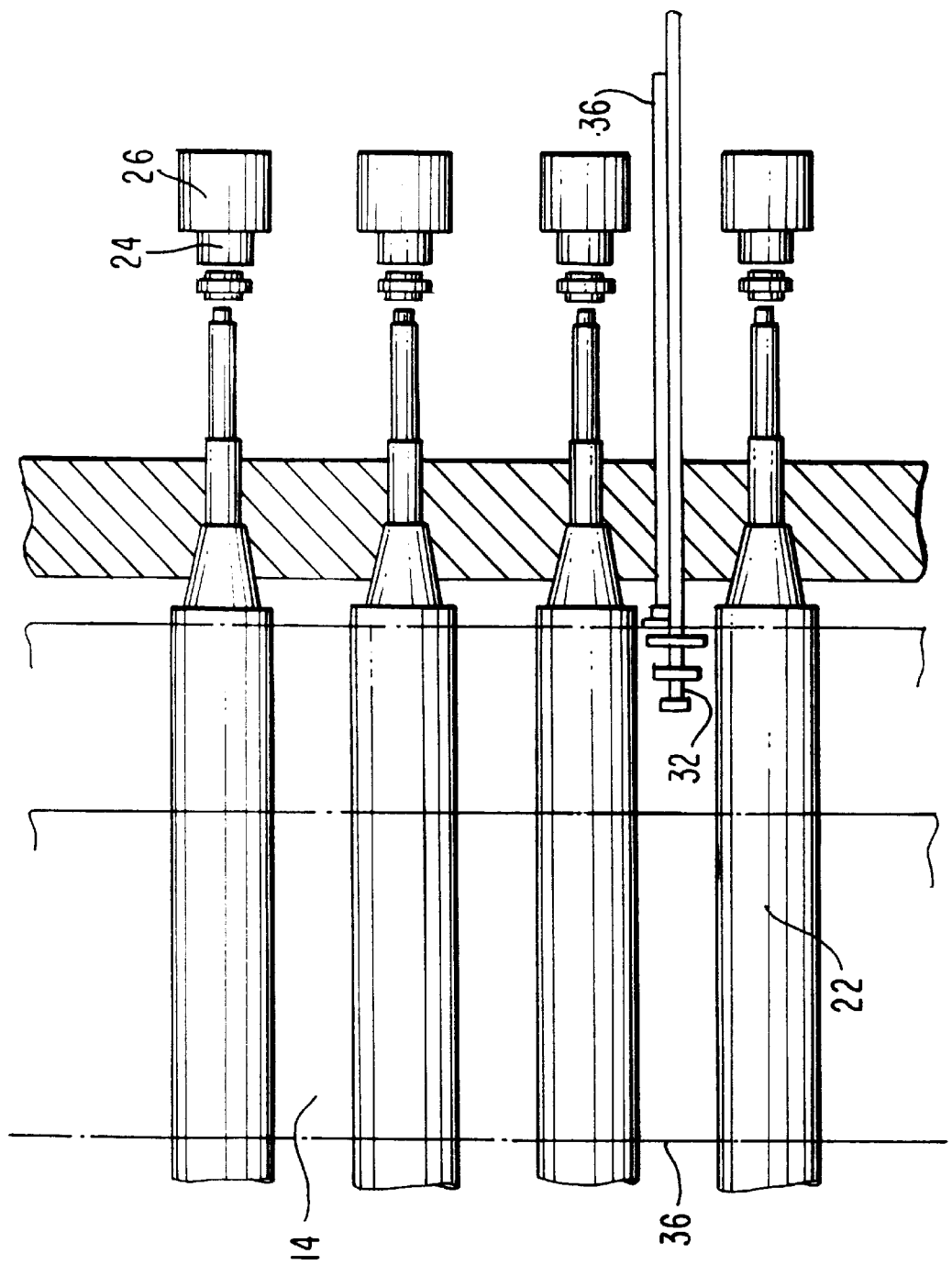
FIG. 2 is a plan view of FIG. 1, showing the position of the system of the present invention.

Now a particular reference will be made to a specific embodiment of the present invention, as illustrated in the figures which are attached and wherein the same numbers refer to the same parts and wherein, FIG. 1 shows an elevation view of the system of the present invention and its positioning in respect to a thermal treatment lehr 10. The illustrated figure shows the lehr 10, which includes a chamber 12, for annealing glass sheets 14. Said chamber 12, is regularly made up in the shape of a tunnel with a rectangular section having on its lateral walls 16 fire refractory brick, (one of them not shown) a lower wall 18, and an upper wall 20. A plurality of rolls 22, located within chamber 12, and said rolls are attached by their ends through bearings 24, located outside the lateral walls 16, of lehr 10. Said rolls 22, are assembled to rotate synchronously through a roll drive system 26, which are respectively connected to a driving motor (not shown). In this manner the glass sheet 14, is longitudinally transported through the lehr 10, by means of the rolls 22.

Now making reference to the system for detecting and automatically adjusting a plurality of burners of the present invention, said system includes: a fixed support structure 25, located externally and in coincidence with the lateral wall 16, of the lehr 10. The structure 25 including a longitudinal section 28, that coincides with the external part of the lateral wall 16, and located on top of the bearings 24, of the rolls 22. A pneumatic sliding structure 30, attached on the upper part of the longitudinal section 28, which is moved forward and backward to transversally adjust the position of a series of burners 32, with respect to the lateral sections of the glass sheet 14 (edge 34), as will be described later.

Figure 3:
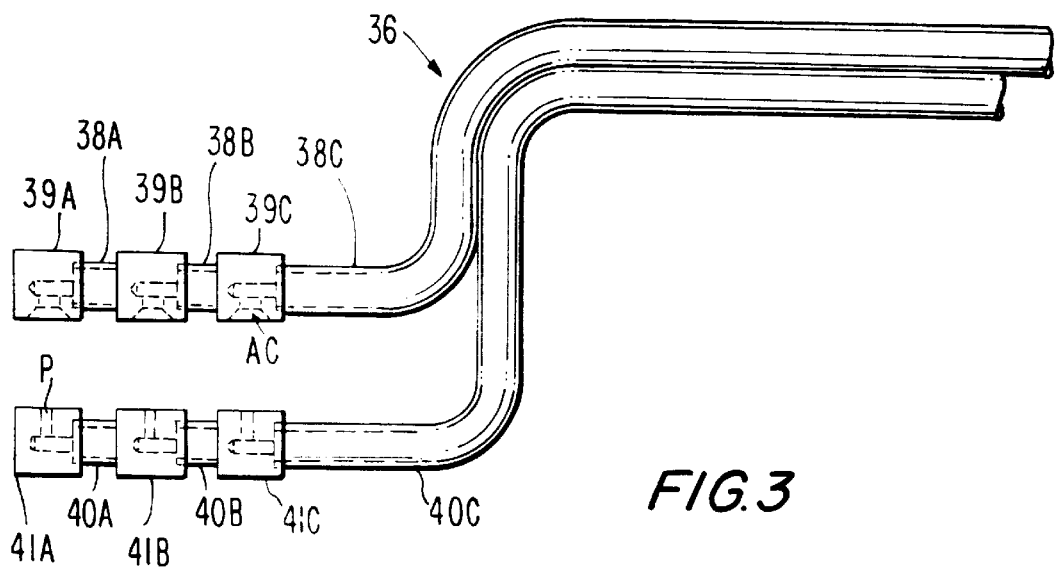
FIG. 3 is a lateral view of a plurality of the positioning sensors showing their location on the edge of a glass sheet.
Figure 4:
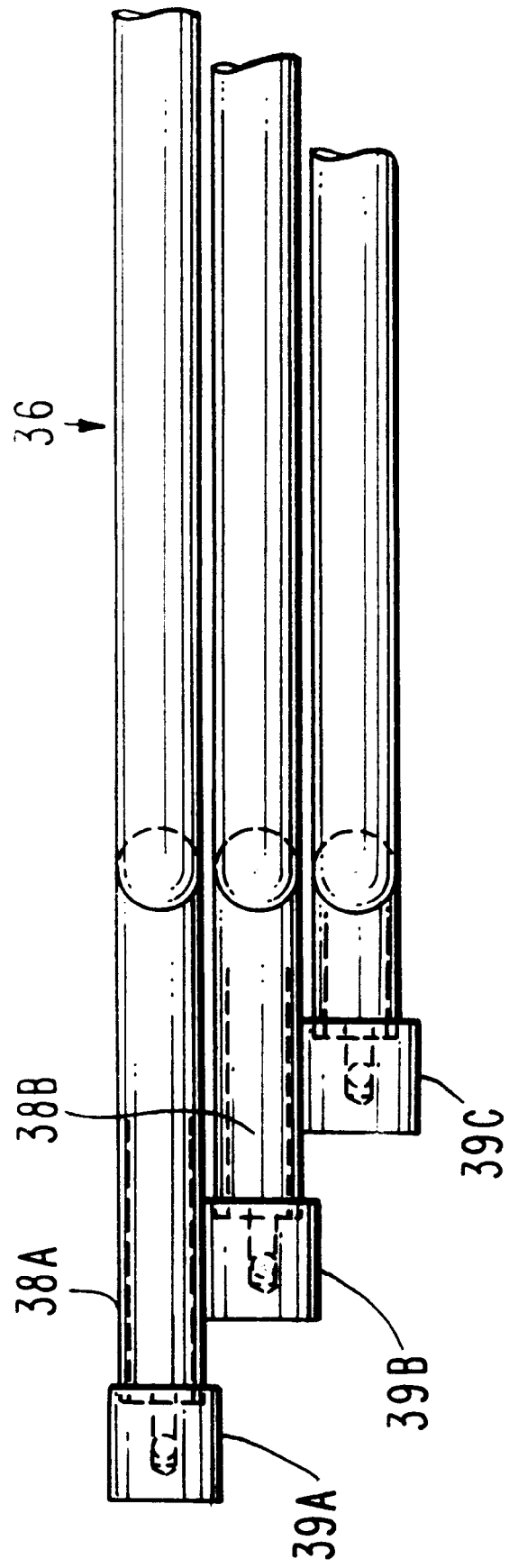
FIG. 4 is a plan view taken of FIG. 3, wherein the location of each one of the positioning sensors is shown.
Figure 5A:
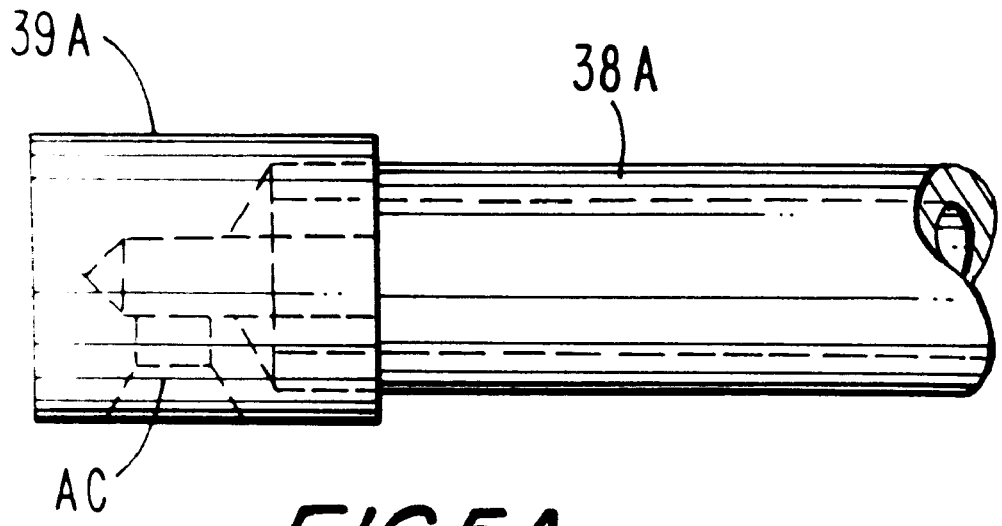
FIG. 5 is a general view of the arrangement of the position sensors on the edge of the glass sheet; and, FIG. 6 is a logic flow chart showing the logic operation of the system and of the method for detecting and automatically adjusting the position of the burners of the present invention.
Figure 5B:
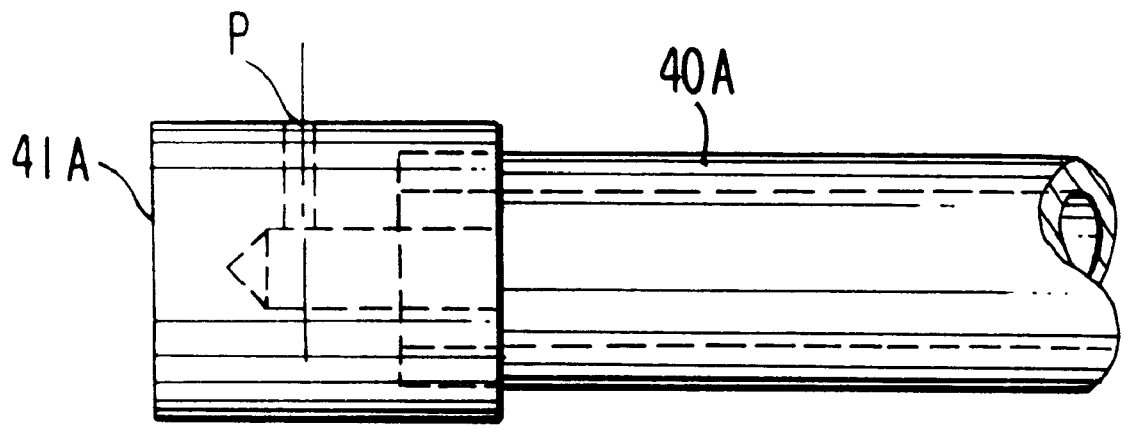

A plurality of pipes 36, attached onto the pneumatic sliding structure 30, are introduced through the lateral wall 16, of lehr 10, through a slot (not shown) towards the interior of chamber 12. Said pipes 36, are divided into three upper pipes 38A, 38B, and 38C, which are located over of the edge 34, of the glass sheet 14. At each one of the pipes 38A, 38B, and 38C, are connected nozzles 39A, 39B, and 39C, each one having a conic aperture AC oriented downwards. Three lower pipes 40A, 40B, and 40C, located under said edge 34, (FIGS. 3 and 4). The pipes 40A, 40B, and 40C, having nozzles, 41A, 41B, and 41C, each one having a passage P, oriented to coincide with the conic aperture AC.

As is illustrated in FIGS. 3 and 4, each one of the ends of the upper pipes 38A, 38B, and 38C, are placed at different distances, one from the other, in respect to the width of the glass sheet 14. In the same manner, the lower pipes 40A, 40B, and 40C, are located at the same pre-established distances for the pipes 38A, 38B, and 38C. As is shown in FIG. 3, the upper nozzles 39A, 39B, and 39C, are axially aligned, by pairs, with each one of the lower nozzles 41A, 41B, and 41C, in order to detect the position of the edge 34, in respect to the burners 32. Said upper and lower nozzles are arranged in this manner to determine the exit pressure of a continuous flow of air which is blown to arrive at each one of the lower pipes 40A, 40B, and 40C, and it is made to flow in coincidence with the upper pipes 38A, 38B, and 38C. The exit pressure of the air between nozzles 39A, 39B, and 39C, and the nozzles 41A, 41B and 41C, are recorded by differential pressure switches (not shown). The exit pressure of each one of the nozzles is sent to be interpreted by a programmable logic controller 46, which adjusts transversally, the position of the burners 32, in respect to the trajectory of the edges 34, of the glass sheet 14.

Now making a particular reference to the burners 32, these are coupled over the sliding structure 30, conjointly with a plurality of pipes 36. The burners 32, include a pipe 42, which goes through the lateral wall 16, and is located on the upper part of the glass sheet 14. The burners 32, are fed with a mixture of gas-air in order to anneal the edge 34, of the glass sheet 14.

Figure 6:
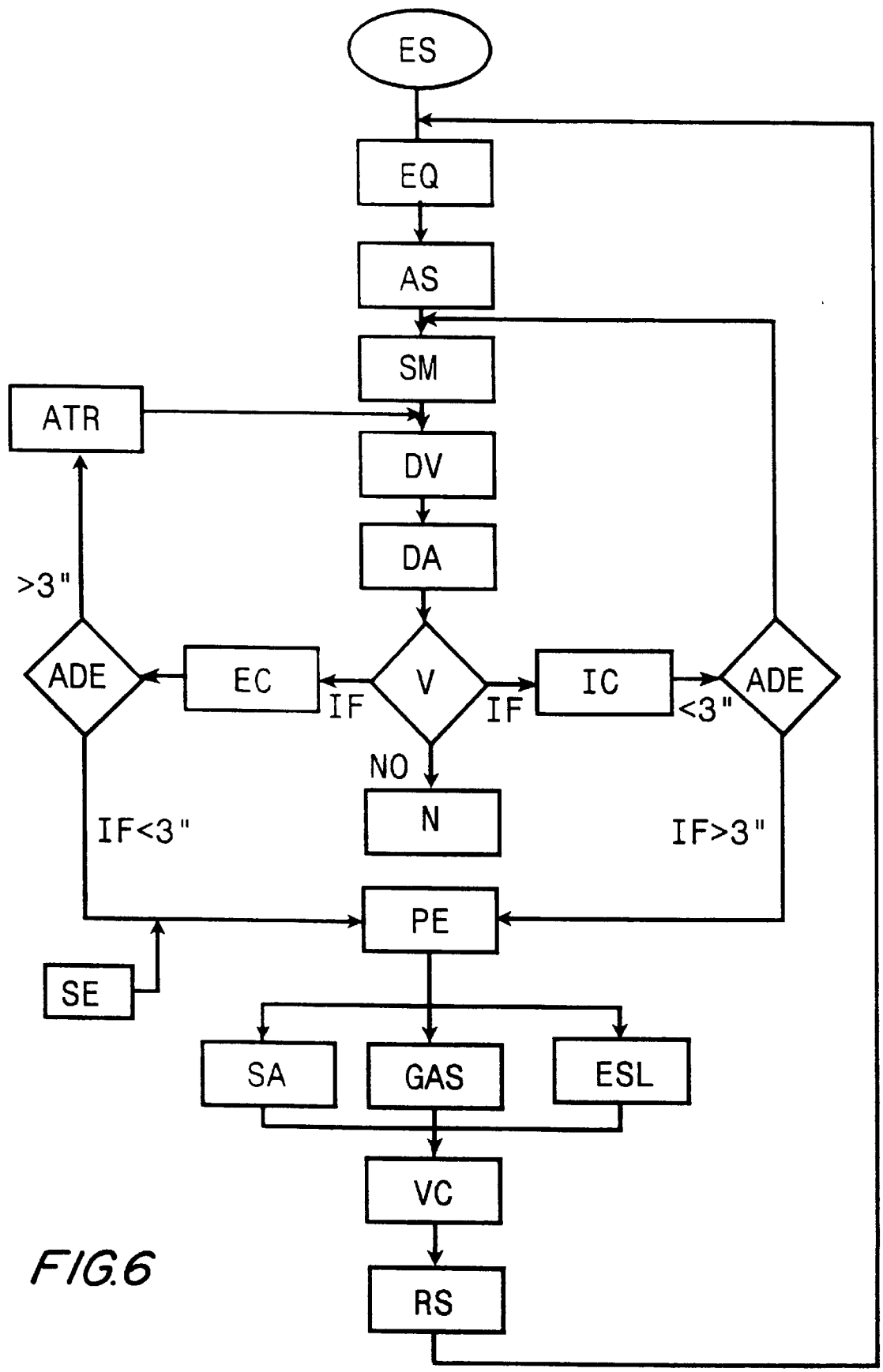

In accordance with the above, the logic operation of the method and the system of the present invention is illustrated in the logic flow chart of FIG. 6, and it includes the steps of: start the system ES; ignite the burners EQ (32); start the system AS, (programmable logic controller 46) in order to check its operation program; advancing with a transversal movement -to the width of the glass sheet-, the detection and adjustment system SM (the group consisting of the pneumatic sliding structure 30, the burners 32, the upper pipes 38A, 38B, and 38C, and the lower pipes 40A, 40B, and 40C) until the presence of the glass DV is detected (glass sheet edges 34). If the system SM detects glass it stops the advance DA, of the system SM.

Figure 3A:
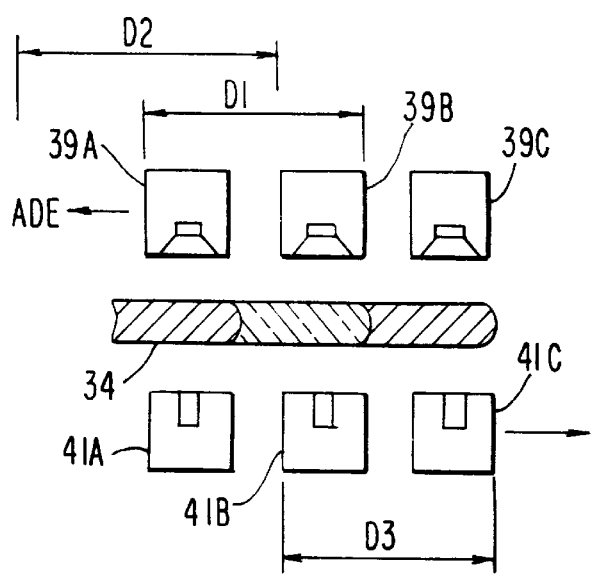
FIGS. 3A and 3B, are detailed views of two embodiments of the positioning sensors showing its position on the edge of a glass sheet.

The functioning of the stage that detects the glass presence is carried out as follow (see FIGS. 3 and 3A): a flow of continuous air is provided to each one of the nozzles 41A, 41B, and 41C, which comes from the lower pipes 40A, 40B, and 40C, projecting said air flow from bottom to top until it is discharged onto the corresponding nozzles 39A, 39B and 39C, of the series of upper pipes 38A, 38B, and 38C, until the flow of air between the two first nozzles 39A, and 39B, and the first two nozzles 41A, and 41B, will be interrupted by the presence of glass at a pre-established distance D1. The nozzles 39C, and 41C, corresponding to the pipes 38C and 40C, maintaining a continuous flow apart from the edge 34, of the glass sheet, 14.

If the detection and adjustment system SM, detects some movement of the glass V (edge 34 of the glass sheet 14) towards the interior of the chamber IC, at a distance or range D2, the system SM has an inside movement ADE of chamber 10, until it again reaches the position D1 (approximately 3 inches). In this case, the nozzle 39B, corresponds to the intermediate pipe 38B, receives and detects the air flow coming from the nozzle 41B, which is connected to pipe 40B. The exit pressure of the air between the two nozzles 39B and 41B, is recorded by a differential pressure switch (not shown) and sends the corresponding signal to the programmable logic controller 46, in order to move the burners 32, with a forwards movement, until the air flow between the two first nozzles 39A and 39B, corresponding to pipes 38A and 38B, and the two first nozzles 41A and 41B, corresponding to pipes, 40A, and 40B, is interrupted by the presence of the glass sheet.

If the width of the glass sheet 14, (edge 34) moves towards a distance D3, (approximately 3 inches) towards the exterior of the chamber EC, the system SM effects a backward movement ATR of the chamber 10. In this case when the flow of air is interrupted between nozzles 39C and 41C, corresponding to pipes, 38C, and 40C, a differential pressure switch (not shown) detects the lack of pressure flow between said nozzles 39C and 41C, of the pipes 38C, and 40C, and send the corresponding signal to the programmable logic controller 46, in order to move the burners 32, backwards to free the glass sheet presence and reestablish newly the flow of air between pipes 38C and 40C.

If the glass sheet maintains a constant distance (distance D1) the system SM is fixed in respect to said edge 34, and this is considered to be under normal operation N.

Figure 3B:
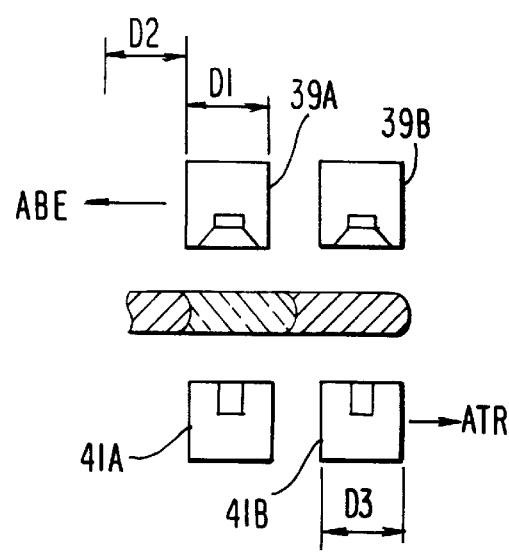

In a second embodiment of the system of the present invention, the system can be manufactured with two position sensors (FIG. 3B), i.e., two upper position sensors 39A, and 39B, and two lower position sensors 41A, and 41B.

The detection and adjustment is delimited by a distance D1, and it functions under the same principle that was described for the case of the three position sensors (FIG. 3A), i.e., if the detection and adjustment system SM detects any glass edge movement V (edge 34 of glass sheet 14) towards the interior of the chamber IC, at a distance or range D2, the system SM has an inside movement ADE of chamber 10, until it is aligned newly with the position D1.

If the width of the glass sheet 14 (edge 34) moves to a distance D3 (approximately 3 inches), the system SM has a backward movement ATR, until the presence of the glass between sensor 39B and 41B is liberated, and reestablishes newly the flow of air between the pipes 39B and 41B.

On the other hand, if the width of the glass sheet 14, moves inwards a distance that is greater than D2, or moves to the outside to a distance greater than D3 (FIGS. 3A and 3B), the system SM goes back to an emergency position PE, putting into effect three simultaneous operations as follows: it makes the alarm system SA, operate, turns on the lights ESL, and disconnects the gas and air supply GAS. Later the behavior of the equipment VC is verified, the system RS is reestablished again and the turning on step EQ is reinitiated.

The system used to detect and automatically adjust the position of the burners is also designed to retract in case of an emergency, in accordance with an exterior signal to the system SE, sent by any other part or section of the process.

Even though with the above described embodiment an arrangement of pipes 38A, 38B and 38C, and 40A, 40B, and 40C, has been used with their corresponding nozzles, 39A, 39B, and 39C, and 41A, 41B, and 41C, in order to detect the presence or absence of the glass sheet through the detection or the interruption of a flow of air between each one of the different nozzles 39, and 41, and which through a programmable logic controller, 46, the position of the burners 32, is adjusted in respect to the edge 34, of the glass sheet 14, it must be understood that said series of pipes 38, 40, can be substituted for a single series of position sensors located either on top or below of said glass sheet 14. Also in an additional embodiment of the present invention, said system may be operated through position sensors based on laser rays or on glass temperature detecting sensors.

However, it should be understood that the described invention should not be limited to the embodiments said above, and it will be apparent to the experts in the field, that other diverse embodiments can be implemented, as well as alternative processes, which will be clearly contained within the spirit and scope of the invention which makes the following claims.

We claim:

1. A method for automatically detecting the edge of a continuous glass sheet and adjusting the position of a plurality of burners with respect to the edge of the continuous glass sheet, said glass sheet being transported by means of rolls through a thermal treating lehr, said method including the steps of:

inserting, in the lehr, a means for detecting the position of the edge of the glass sheet, said means for detecting being attached conjointly with said plurality of burners;

advancing said detecting means and said plurality of burners toward the edge of the glass sheet to detect the position of the edge of the glass sheet and position the plurality of burners with respect to the edge of the glass sheet; and, maintaining a predetermined position of the detecting means with respect to the edge of the glass sheet, and for each variation in the position of the edge of the glass sheet, advancing or retracting the detecting means over the edge of the glass sheet to maintain said predetermined position and to advance or retract the conjointly attached burners in accordance with said variation in the position of the edge of said glass sheet so as to adjust the position of said plurality of burners with respect to the edge of the continuous glass sheet.

2. A method for automatically detecting the edge of a continuous glass sheet and adjusting the position of a plurality of burners with respect to the edge of the continuous glass sheet, as claimed in claim 1, wherein the step of maintaining a predetermined position of the detecting means includes the step of:

transversely advancing said detecting means to detect the edge of the glass sheet until a first adjustment position is reached at a first position on said edge of the glass sheet; and stopping the advancing of the detecting means once the first adjustment position on the edge of the glass sheet has been reached.

3. A method for automatically detecting the edge of a continuous glass sheet and adjusting the position of a plurality of burners with respect to the edge of the continuous glass sheet, as claimed in claim 1, wherein the step of maintaining a predetermined position of the detecting means includes the step of:

transversely retracting said detecting means to detect the edge of the glass sheet, until a second adjustment position is reached at a second position on said edge of the glass sheet, and stopping the retracting of the detecting means once the second adjustment position has been reached.

4. A method for automatically detecting the edge of a continuous glass sheet and adjusting the position of a plurality of burners with respect to the edge of the continuous glass sheet, as claimed in claim 1, wherein the step of maintaining a predetermined position of the detecting means comprises the steps of:

providing a plurality of upper sensors placed above the edge of the glass sheet;

providing a plurality of lower sensors placed underneath the edge of the glass sheet;

axially aligning said upper and lower sensors with respect to each other;

providing a continuous flow of air under pressure from one of said upper or lower plurality of sensors to the other of said upper or lower plurality of sensors;

interrupting the continuous flow of air under pressure from at least one sensor of said one of said upper or lower plurality of sensors to at least one sensor of the other of said upper or lower plurality of sensors when the edge of the glass sheet is detected between said upper and lower sensors, but maintaining said continuous flow of air between at least one sensor of said one of said upper or lower plurality of sensors to at least one sensor of the other of said upper or lower plurality of sensors that are not detecting the edge of the glass sheet;

determining variations of distance between the sensors that are detecting the edge of the glass sheet and the sensors that are not detecting the edge of the glass sheet with respect to the edge of the glass sheet; and, adjusting a position of the burners depending on the variations of distance.

5. A method for automatically detecting the edge of a continuous glass sheet and adjusting the position of a plurality of burners with respect to the edge of the continuous glass sheet, as claimed in claim 4, wherein the step of providing a continuous flow of air under pressure from one of said upper or lower plurality of sensors to the other of said upper or lower plurality of sensors comprises:

sending adjustment signals for moving the upper and lower sensors and the burners to a retracted position when the continuous flow of air under pressure between all the plurality of upper and lower sensors are interrupted by the glass sheet.

6. A method for automatically detecting the edge of a continuous glass sheet and adjusting the position of a plurality of burners with respect to the edge of the continuous glass sheet, as claimed in claim 4, wherein the step of providing a continuous flow of air under pressure from one of said upper or lower plurality of sensors to the other of said upper or lower plurality of sensors comprises:

sending adjustment signals for moving the upper and lower sensors and the burners toward the edge of the glass sheet when the continuous flow of air under pressure between all the plurality of upper and lower sensors is not interrupted.

7. A method for automatically detecting the edge of a continuous glass sheet and adjusting the position of a plurality of burners with respect to the edge of the continuous glass sheet, as claimed in claim 4, wherein said method includes:

effecting an emergency retraction of the detecting means and the conjointly attached burners, when the continuous flow of air under pressure between all the plurality of upper and lower sensors is detected or when the continuous flow of air under pressure between all the plurality of upper and lower sensors is interrupted.

\* \* \* \* \*